July 19, 1960 H. GEHRE 2,945,376
PRESSURE MEASURING DEVICE
Filed Dec. 24, 1953 2 Sheets-Sheet 1
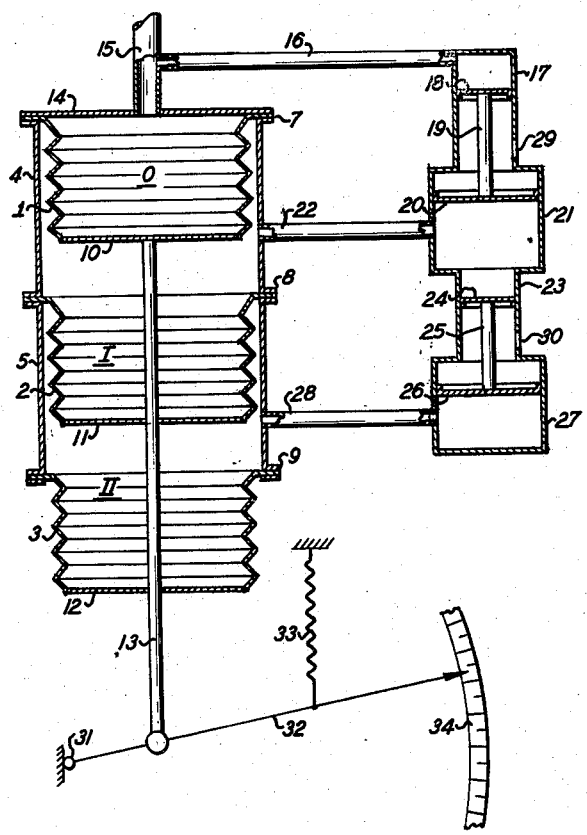
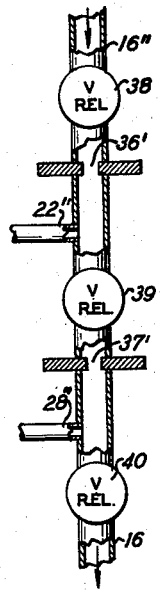
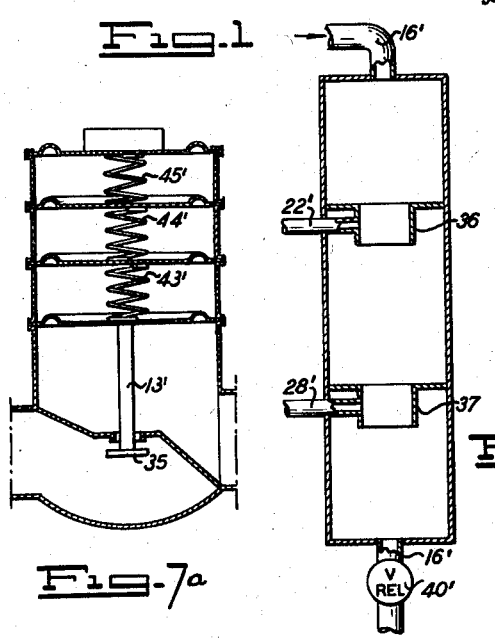
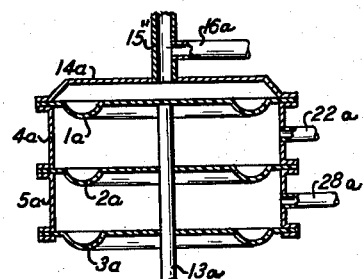
INVENTOR.
HANS GEHRE
BY
ATTORNEYS July 19, 1960 H. GEHRE 2,945,376
PRESSURE MEASURING DEVICE
Filed Dec. 24, 1953 2 Sheets-Sheet 2

INVENTOR.
HANS GEHRE
BY
Burgess Dinklage Sprung
ATTORNEYS

July 19, 1960 H. GEHRE 2,945,376
PRESSURE MEASURING DEVICE
Filed Dec. 24, 1953 2 Sheets-Sheet 2

INVENTOR.
HANS GEHRE
BY
Burgess Dinklage Sprung
ATTORNEYS

United States Patent Office 2,945,376
Patented July 19, 1960

2,945,376
PRESSURE MEASURING DEVICE
Hans Gehre, Bernhard-Strasse 63, Oberkassel (Siegkreis), Germany
Filed Dec. 24, 1953, Ser. No. 400,251
Claims priority, application Germany Jan. 2, 1953
18 Claims. (Cl. 73—407)

The present invention relates to an improvement in pressure measuring devices or the pressure measuring part of auxiliary devices (volume correctors, regulators, control devices and the like) for the measurement of gases and liquids.

The construction of these devices is subject to serious difficulties, as far as the determination of higher pressures is concerned since an error-free indication or translation of the measuring or control pressure is desired with a high sensitivity of the device. The usual membranes are unsuitable for these cases. One type does not have sufficient strength to withstand the strains occuring and the other has too great a rigidity and hence gives deflections and indications which are too small. Replacement of the membranes by indicator pistons or the like does not come into consideration, since the frictional and leakage losses become too great, even if the pistons are rotated to bring about reduction thereof.

It is possible to avoid these difficulties by the present invention and to carry out measurements, volume corrections, regulations, controls etc. safely and free from errors, even at the highest pressures.

The invention essentially consists in that, in using a known (German patent specifications Nos. 299,232 and 719,562) arrangement of several spaced and preferably co-axially series-connected membranes coupled together and constituting the setting or control member, the front face of the first membrane is subject to the service pressure (measuring, regulating, control etc. pressure) and the rear face of the last is subject to a counterpressure of desired size, whereas the spaces between the membranes are subject to graduated pressures and the sum of the pressure differences effective at the membranes is at least approximately equal to the total pressure drop across the external faces of the end membranes.

Preferably atmospheric pressure comes into consideration for the counterpressure. Some other pressure, e.g. a pressure decreased below the atmospheric pressure can also be used as the counter-pressure, in accordance with the given conditions. For any practical case, the required number of pressure gradations is thus given directly from the given total pressure drop on the one hand and the capacity for loading of the individual membranes on the other hand. The pressure gradation, subsequently referred to as the pressure cascade, can be produced in extremely varied ways, either in the membrane system itself or by a special auxiliary device which is connected up to the membrane system.

The invention and its mode of operation will be explained in detail below with reference to various embodiments illustrated in the drawings, in which:

Fig. 1 shows diagrammatically in side section an embodiment in which the pressure cascade is produced by an auxiliary device;

Fig. 2 shows a modification of the membrane arrangement of Fig. 1;

Figure 5:
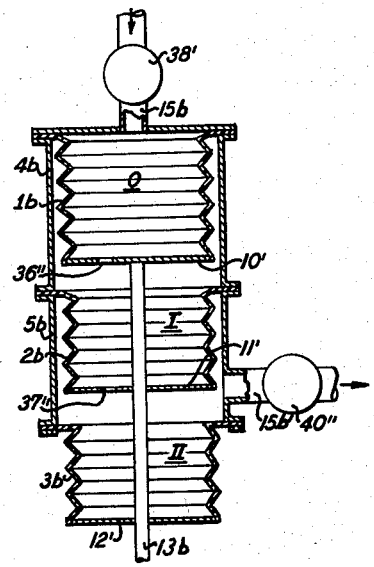
Figure 7:
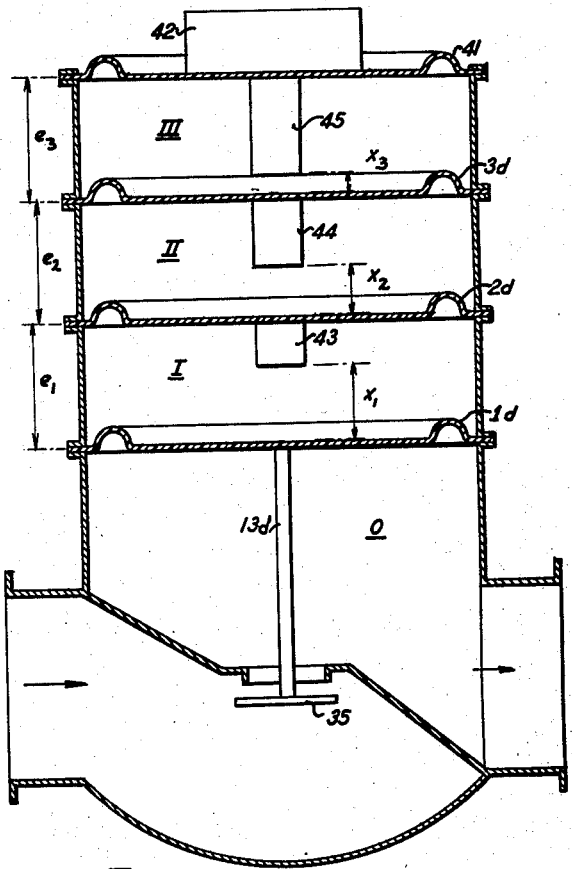
Figure 6:
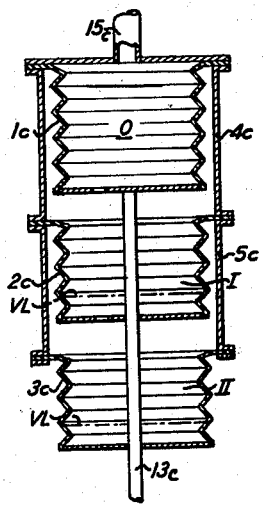
Figure 8:
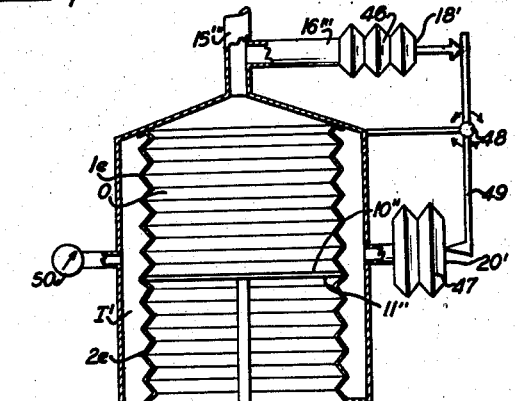
Figure 5:
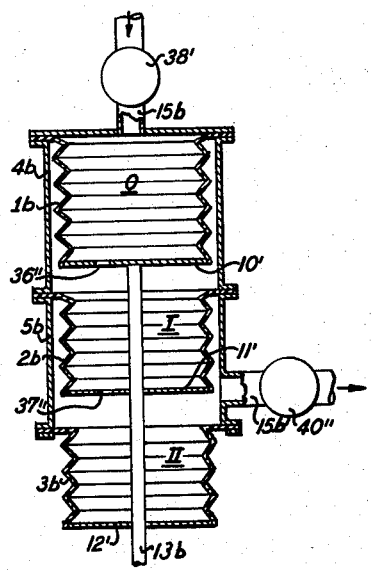
Figure 7:
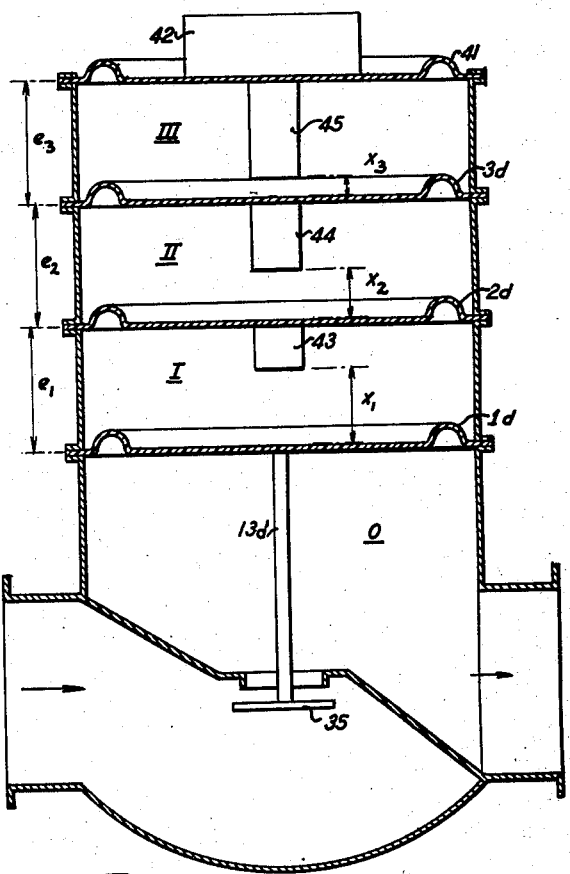
Figure 6:
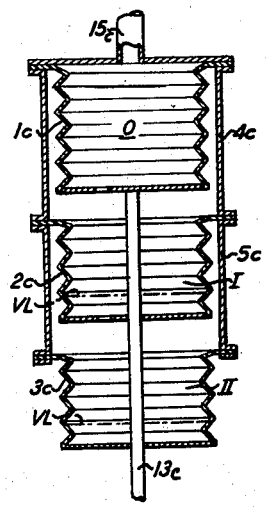
Figure 8:
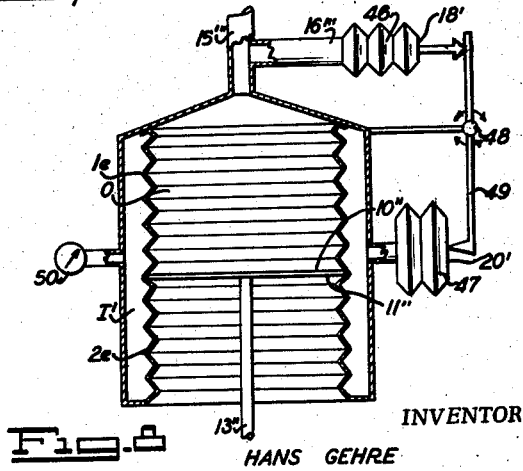

Figs. 3 and 4 each show further forms of the auxiliary device;

Figs. 5 and 6 show modifications in which the pressure cascade is produced in the membrane system itself;

Fig. 7 shows a further embodiment in which the membrane system serves to control a pressure regulator;

Fig. 7a shows a modification of the embodiment of Fig. 7;

Fig. 8 shows a special form in which an auxiliary membrane system is employed.

In all the figures, the same or corresponding parts have the same references.

In the embodiment according to Fig. 1, three corrugated-tube membranes 1, 2 and 3 are connected in series in a co-axial arrangement in a two-part cylindrical vessel 4, 5 and are positioned in a sealing manner with their edges at 7, 8 and 9, whereas their base plates 10, 11 and 12 are rigidly connected together by a shaft 13. The upper vessel 4, and hence the space O enclosed by the membrane 1 as well, is closed over by a cover 14. A pipe 15 discharges into it, by which the space O is connected up to the service pressure.

The production of the pressure cascade is caused by a special device which consists of a system of spaced series-connected differential pistons controlled from the service pressure, and in which the spaces between the differential pistons are connected up to the intermediate spaces of the membrane system of the pressure measuring device.

A pipe 16 leads off from the pipe 15 and transmits the service pressure to a piston 18 movable in a cylinder 17. The loading of the piston 18 is transmitted by a shaft 19 to a larger piston 20, which is movable in an enclosed cylinder 21. The space in the cylinder 21 lying beneath the piston 20 is in communication by way of a pipe 22 with the space I between the two membranes 1 and 2.

The cylinder 21 extends downwardly into a smaller cylinder 23. A piston 24 is located in the latter, which transmits its load by way of a shaft 25 to a larger piston 26, which is movable in a corresponding cylinder 27. The lower part of this cylinder is connected by a pipe 28 to the space II between the membranes 2 and 3. A ventilating opening 29 is located in the lower part of the cylinder 17 and a ventilating opening 30 in the lower part of the cylinder 23.

The shaft 13 forms the operating shaft of the whole device. With a purse pressure meter, for instance, it operates an indicator device, such as a pointer 32 pivotally mounted at 31 and subject to the re-setting force of a spring 33 and co-operating with an indicator scale 34, or a pressure balance or the like. With a pressure regulator, it operates a throttle member 35 of a regulating valve, as shown in Fig. 7. With a volume reducer (such as in accordance with German patent specifications Nos. 863,850 and G 6930 IXb/42e, the latter of which corresponds to U.S. Patent No. 2,861,453), it transmits the pressure quantity or quantities necessary for the representation of the volume correction factor $k$ directly or indirectly to the correcting mechanism located in the counting mechanism drive of the associated meter.

The cylinder 21, the pipe 22 and the space I, on the one hand, as well as the cylinder 27, the pipe 28 and the space II, on the other, are completely filled with liquid, so that any loading exerted on the pistons 20 and 24 is transmitted as the corresponding liquid pressure in the spaces I and II and is hence effective on the membranes 1, 2 and 3. This load is given, on the one hand, by the size ratio of the pistons 18 and 20 and the service pressure $p$ acting on the piston 18 through the pipe 16 and, one the other hand, by the size ratio of the pistons 24 and 26 and the liquid pressure acting on the piston 24, which is transmitted by the piston 20.

The dimensions of the pistons 18 and 20 are determined so that a pressure $p_1$ prevails in the space I, which pressure is smaller by a predetermined desired amount than the service pressure $p$ prevailing in the space O of the corrugated tube membrane 1 and so that pressure gradation from $p$ to $p_1$ which is produced is suited to the strength of the corrugated tube membrane 1. Correspondingly, the size ratio of the pistons 24 and 26 is chosen so that the pressure gradation from $p_1$ to $p_2$, as well as the gradation from $p_2$ to the pressure zero (atmospheric pressure) or another predetermined counterpressure remain within allowable limits, in view of the loading capacity of the corrugated tube membranes 2 and 3.

Only the small pressure gradation from $p$ to $p_1$ is always effective on the membrane 1, instead of the total pressure drop from the service pressure $p$ to the counterpressure selected, only the small pressure gradation from $p_1$ to $p_2$ on the membrane 2 and only the small pressure gradation from $p_2$ to the selected counter-pressure on the membrane 3, this counterpressure in Fig. 1 being for example zero (=the barometric state $ba$ i.e. atmospheric pressure or zero gauge pressure).

Because of the rigid connection of the corrugated tube membranes 1, 2 and 3, the spaces I and II do not suffer any volume variations on movement of the shaft 13. The pistons 18, 20 and 24, 26 hence also remain at rest on movement of the shaft 13, so that the sensitivity of the corrugated tube membranes is not affected by frictional forces of the pistons and the service pressure is correctly and fully transmitted. The inherent springiness of the membrane bodies 1, 2 and 3 need not be considered, since it can be taken into account by suitable calibration or compensated for by suitable means. Non-springy membranes can also be used, e.g. the customary plate membranes, as shown in Fig. 2. As to the other parts the arrangement is the same as in Fig. 1. Thus, parts 1a, 2a, 3a, 4a, 5a, 13a, 14a and 16a generally correspond to parts 1, 2, 3, 4, 5, 13, 14 and 16 respectively of Fig. 1.

If the service pressure of the medium being measured is sufficiently high, the pressure cascade can also be produced, for example, with the arrangement shown in Fig. 3. It comprises a corresponding number of throttle devices (orifices or the like) 36, 37 arranged in series in the pipe 16, through which a branch stream of the medium to be measured flows. This branch stream flows out of the throttles if the same are properly dimensioned at the speed of sound and an outlet pressure corresponding to the critical pressure ratio is produced, this outlet pressure being transmitted by the pipes 22' and 28' to the spaces I and II. If, with very high service pressures, the total pressure drop present is divided into a large number of pressure gradations, the number of throttles is to be selected to correspond to the number of membranes used. Part 16' corresponds to part 16 of Fig. 1.

In the arrangement shown in Fig. 3, a continuous flow is necessary for producing the pressure cascade, the flow discharging to the free air, for example, or, better still, leading to a low pressure pipe. The pressure gradation in the spaces between the membranes can be suited to the given strength conditions of the membranes by inserting pressure regulators, by virtue of an arrangement of inserting a pressure regulator before each of the throttle devices 36 and 37, which pressure regulator may be of any desired construction.

This arrangement is illustrated diagrammatically in Fig. 4, wherein the pressure regulators of shut-off valves are designated 38 and 39. In order to avoid losses in the low-pressure measurement, a pressure-controlled shut-off valve 40 of any known construction can be provided, which valve only opens and puts in operation the pressure cascade on attaining a sufficiently high service pressure. Parts 16'', 22'', 28'', 36' and 37' correspond to parts 16', 22', 28', 36 and 37 respectively of Fig. 3.

As mentioned, the arrangement can also be designed so that the pressure cascade is formed in the membrane system itself. The embodiment shown in Fig. 5 is given as an example, in which the throttles 36'' and 37'' are provided in the base plates 10' and 11' of the membranes 1b and 2b. The continuation of the pipe 15b is positioned at the side wall of the housing part 5b as pipe 15b', in view of the preferential connection to said low pressure pipe, as described above, and a pressure regulator or shut-off valve (see Fig. 4, references 38 and 40) is arranged in it, if necessary. Parts 1b, 2b, 3b, 4b, 5b, 10' 11', 12' and 13b respectively correspond to parts 1, 2, 3, 4, 5, 10, 11, 12 and 13 of Fig. 1 while parts 36'', 37'', 38' and 40'' correspond to parts 36', 37', 38 and 40 of Fig. 4.

The embodiment shown in Fig. 6 is even simpler. In this instance the pressure cascade is likewise produced in the membrane system itself. In this case the spaces between the membranes are closed and are partially filled with liquefied gas or readily vaporizable liquids of different vapor pressures, for example, the space I with propane, the space II with butane or the like. The higher pressure then arises in the space I and the lower in the space II. Parts 1c, 2c, 3c, 4c, 5c, 13c and 15c correspond to parts 1, 2, 3, 4, 5, 13 and 15 of Fig. 1.

In the embodiment according to Fig. 7, in which the membrane arrangement according to the invention serves as mentioned as the control member of a pressure regulator, the pressure cascade is again obtained in the membrane system itself. An arrangement having four pressure gradations and correspondingly four membranes, 1d, 2d, 3d and 41 is shown. The spaces I, II and III between them are closed. The upper membrane 41 is loaded with a weight 42 which determines the regulating pressure $p$. The lower membrane 1d controls the shaft 13d of the regulating valve 35 secured to it.

Extension members 43, 44 and 45 are located on the membranes 2d, 3d and 41. The heights of these members are made to suit existing requirements and are, for example and preferably, so calculated that the pressure differences at all the membranes are of about the same size.

Designating the membrane spacings $e$ with the membranes unloaded, in order to consider this case mathematically, and choosing $e_1 = e_2 = e_3 = e$ for example, if in the unloaded state the pressure in the spaces I, II and III is the atmospheric pressure (=barometric state $ba$), then on full loading, namely, when the membranes touch the extension members 43, 44 and 45 the absolute end pressure in the spaces I, II and III is given by:

$$p_1 = ba \cdot \frac{e}{e-x_1}, \quad p_2 = ba \cdot \frac{e}{e-x_2}, \quad p_3 = ba \cdot \frac{e}{e-x_3}$$

where $x$ is the linear measure of the movement of the individual membranes corresponding to variations occuring in the original membrane spacings $e$.

If the pressure difference prevailing at the membranes and determining the straining of their material is called $\Delta p$, there is given:

for the membrane 1, $\Delta p_1 = p - p_1$,
for the membrane 2, $\Delta p_2 = p_1 - p_2$,
for the membrane 3, $\Delta p_3 = p_2 - p_3$,
for the membrane 41, $\Delta p_{41} = p_3 - ba$, where $p$ in this case is the regulated pressure established by means of the throttle member 35.

The heights of the extension members 43, 44 and 45 are hence determined for this case. Conversely, the heights of these extension members can also be made the same size. The spacings $e_1$, $e_2$ and $e_3$ would then be determined according to the above.

Instead of rigid extension members, elastic ones could also be used, that is, the membranes could be connected together by springs for example, as indicated in Fig. 7a by springs 43', 44' and 45'.

If only two corrugated tube bodies, such as that indicated by 1 and that by 2, are used in the arrangement of Fig. 1 and they are connected base-to-base by their base plates 10 and 11 as shown by 10'' and 11'', the simplified embodiment illustrated in Fig. 8 is given, in which the space I' lies on the outer face of the membrane 2e as well as on the outer face of the membrane 1e. The arrangement for producing the pressure cascade consists, for example, of two correspondingly dimensioned corrugated tube bodies 46 and 47, the first being connected to the pipe 16''' and the second to the space I' of the membrane system. The corrugated tube body 47 and the space I' are considered again as being filled with liquid. The service pressure acts by way of the base plate 18', which corresponds to the piston 18 in Fig. 1, and the lever 49 pivotally mounted at 48 on the base plate 20' of the corrugated tube member 47. This base plate corresponds to the piston 20 and the pivot lever 49 serving as the force transmitter corresponds to the shaft 19 in Fig. 1. Also, part 13'' corresponds to part 13 of Fig. 1.

In those cases where the service pressure $p$ may be considered to be constant or not exceeding certain extreme limits, the pressure $p_1$ in the space I can be made constant, i.e. no special control of the pressure cascade by the service pressure there is required, but a correspondingly constant loading of the base plate 20' suffices, which together with the corrugated tube body 47 forms the device for producing the pressure cascade. In this simplified embodiment, the branch pipe 16''' with the corrugated tube body 46 and the lever transmission 48, 49 are not required. The loading of the base plate 20' is preferably so chosen that the pressure in the space I' is equal to half the service pressure $p$ (manometer 50), in any case however so that the membranes 1e and 2e are not stressed beyond the permissible extent.

If the spaces I' and 47 are filled with fluid the movability and the continuous loading of the base plate 20' ensures that the pressure in the space I' remains the same. With the base plate 20' immobile, the pressure in space I' would be uncontrollable and temperature-dependent and the danger would arise that the loading limits of the membranes would be exceeded.

This difficulty can be avoided, however, by using a compressible medium such as gas or vapour for filling instead of the liquid. The need for a movable base plate is avoided by the elastic properties of such medium and the corrugated tube body 47 can also be omitted. A special illustration of these modifications appears to be unnecessary.

What I claim is:

1. A fluid pressure measuring device adapted to be connected to a fluid system for measuring service pressure of fluid in the system with reference to a reference pressure, said device comprising a plurality of membranes arranged in a series, at least a portion of each membrane being flexible, including a first membrane at one end and a last membrane at the other end, means including at least the flexible portion of said membranes defining a succession of fluid-filled chambers adapted to exert a pressure counter to the pressure exerted by the service pressure against at least the flexible portion of said first membrane, means connecting all of said membranes for simultaneous movement in response to a pressure difference applied thereacross, said first membrane having the service pressure applied to the side thereof remote from its next adjacent membrane, said last membrane having the reference pressure applied to the side thereof remote from its next preceding membrane, means for applying a pressure intermediate the service pressure and the reference pressure in at least one chamber intermediate said service pressure and said reference pressure so that the pressure differential across at least the flexible portion of each membrane is less than the difference in pressure between the service pressure and the reference pressure, and so that the pressure changes from the service pressure to the reference pressure by increments along the succession of chambers from each chamber to the next adjacent chamber, and means for sensing the motion of the membranes, whereby a large pressure difference between a service pressure and a reference pressure can be measured without the large pressure difference being applied across any one membrane so that relatively weak and non-rigid membranes can be used permitting the obtaining of high sensitivity.

2. A fluid pressure measuring device according to claim 1, said means for applying an intermediate pressure comprising a differential piston cylinder arrangement connected for movement in response to pressure in the fluid systems and for imposing a pressure intermediate the service pressure and the reference pressure within each said chamber.

3. A fluid pressure measuring device according to claim 2, in which the membranes are spaced apart and the space between the membranes and the piston cylinder arrangement is filled with liquid.

4. A fluid pressure measuring device according to claim 3, which includes three membranes and two differential piston cylinder arrangements, one of said piston cylinder arrangements connected for imposing a pressure intermediate the first and second of said membranes within a chamber defined at least partially by said first and second membranes, and the other of said piston cylinder arrangements connected for imposing a pressure intermediate the second and third of said membranes within another chamber defined at least partially by said second and third membranes.

5. A fluid pressure measuring device according to claim 4, in which said membranes are corrugated tube membranes.

6. A fluid pressure measuring device according to claim 4, in which said membranes are plate membranes.

7. A fluid pressure measuring device according to claim 1, said means for applying an intermediate pressure comprising a throttle nozzle, means for passing fluid from the fluid system through said nozzle, and conduit means for applying pressure at the throttle within each said chamber.

8. A fluid pressure measuring device according to claim 7, said means for passing fluid from the fluid system through said nozzle having installed therein a pressure regulator valve.

9. A fluid pressure measuring device according to claim 7, said means for passing fluid from the fluid system through said nozzle having installed therein preceding the throttle a pressure regulator valve.

10. A fluid pressure measuring device according to claim 7, said means for passing fluid from the fluid system through said nozzle including shut-off valve means adapted to open at a predetermined pressure to put the device in operation.

11. A fluid pressure measuring device according to claim 1, in which said means for applying an intermediate pressure comprises means defining throttle flow orifices series flow connecting each said chamber between said membranes.

12. A fluid pressure measuring device according to claim 1, in which there are two membranes, said two membranes being rigidly connected together forming a unit and being connected at the intermediate portion of the common movable membrane side wall of the membrane unit defined by said two membranes, means defining a chamber surrounding said membrane side wall, said means for applying an intermediate pressure being in flow communication with said chamber, said service pressure capable of being applied to the side of said membrane side wall remote from said chamber and on one side of said intermediate portion and said reference pressure capable of being applied to the side of said membrane side wall remote from said chamber and on the other side of said intermediate portion.

13. A fluid pressure measuring device according to claim 12, in which the membrane unit is in the form of a membrane plate and in which said membrane side wall is a corrugated cylindrical wall surrounded by means defining an annular chamber.

14. A fluid pressure measuring device according to claim 13, in which said chamber is a liquid-filled chamber, two auxiliary fluid-filled corrugated tube members are provided, one of which is in pressure communication with the service pressure and the other of which is in pressure communication with said chamber and said membrane side wall, and a lever system is provided connecting said auxiliary corrugated tube members for coordinating movement thereof.

15. A fluid pressure measuring device according to claim 1, in which said means for applying an intermediate pressure provides readily vaporizable liquids having different vapor pressures disposed within each said chamber.

16. A fluid pressure measuring device adapted to be connected to a fluid system for measuring service pressure of fluid in the system with reference to a reference pressure, said device comprising a plurality of membranes arranged in a series, at least a portion of each membrane being flexible, including a first membrane at one end and a last membrane at the other end, means including at least the flexible portion of said membranes defining a succession of fluid-filled chambers adapted to exert a pressure counter to the pressure exerted by the service pressure against at least the flexible portion of said first membrane, said first membrane having the service pressure applied to the side thereof remote from its next adjacent membrane, said last membrane having the reference pressure applied to the side thereof remote from its next preceding membrane, means for applying a pressure intermediate the service pressure and the reference pressure in at least one chamber intermediate said service pressure and said reference pressure so that the pressure differential across at least the flexible portion of each membrane is less than the difference in pressure between the service pressure and the reference pressure, and so that the pressure changes from the service pressure to the reference pressure by increments along the succession of chambers from each chamber to the next adjacent chamber, said membranes and said means for applying an intermediate pressure being positioned in a common vessel, extension members of varying heights positioned one between each pair of membranes in said series which serve as distance members being dimensioned to cause gradations in the pressure differential of about equal magnitude across each of said membranes, and means for sensing the motion of the membranes, whereby a large pressure difference between a service pressure and a reference pressure can be measured without the large pressure difference being applied across any one membrane so that relatively weak and non-rigid membranes can be used permitting the obtaining of high sensitivity.

17. A fluid pressure measuring device according to claim 16, in which said extension members are rigid extension members.

18. A fluid pressure measuring device according to claim 16, in which said extension members are elastic extension members.

References Cited in the file of this patent

UNITED STATES PATENTS

| 2,477,897 | Ray | Aug. 2, 1949 |
| 2,604,116 | Bailey | July 22, 1952 |
| 2,635,581 | Karig | Apr. 21, 1953 |

FOREIGN PATENTS

| 899,287 | Germany | Dec. 10, 1953 |
| 381,701 | France | Nov. 19, 1907 |